US009705879B2

(12) United States Patent
Saboori et al.

(10) Patent No.: US 9,705,879 B2
(45) Date of Patent: Jul. 11, 2017

(54) EFFICIENT AND RELIABLE ATTESTATION

(71) Applicant: Microsoft Technology Licensing, LLC, Redmond, WA (US)

(72) Inventors: Anoosh Saboori, Seattle, WA (US); Victor W. Heller, Sammamish, WA (US); Xiaohong Su, Redmond, WA (US); Dayi Zhou, Redmond, WA (US); Kinshuman Kinshumann, Redmond, WA (US); James Hugh Morgan, Seattle, WA (US); Stefan Thom, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 54 days.

(21) Appl. No.: 14/630,495

(22) Filed: Feb. 24, 2015

(65) Prior Publication Data

US 2016/0080379 A1 Mar. 17, 2016

Related U.S. Application Data

(60) Provisional application No. 62/051,882, filed on Sep. 17, 2014.

(51) Int. Cl.
*H04L 29/06* (2006.01)
*H04W 12/06* (2009.01)

(52) U.S. Cl.
CPC ...... *H04L 63/0876* (2013.01); *H04L 63/0823* (2013.01); *H04L 63/10* (2013.01);
(Continued)

(58) Field of Classification Search
None
See application file for complete search history.

(56) References Cited

U.S. PATENT DOCUMENTS 7,882,359 B2   2/2011  Camenisch
7,930,733 B1 *  4/2011  Iftode ............... G06F 21/52
                                                    711/152
(Continued)

FOREIGN PATENT DOCUMENTS

WO   WO2008000721 A1   1/2008
WO   WO2010053999 A1   5/2010
WO   WO2011130211 A1   10/2011

OTHER PUBLICATIONS

Brickell, et al., "Enhanced Privacy ID: A Direct Anonymous Attestation Scheme with Enhanced Revocation Capabilities", In Proceedings of the 2007 ACM workshop on privacy in electronic society, Oct. 29, 2007, 36 pages.
(Continued)

*Primary Examiner* — Trang Doan
(74) *Attorney, Agent, or Firm* — Jacob P. Rohwer; Newport IP, LLC

(57) ABSTRACT

A computing device, or a security component of a computing device, implements delayed attestation by initially providing first credentials to a remote access device to establish a first level of trust. The first credentials may be provided before or while the computing device or the security component is obtaining security information from a remote security device. The security information is used to generate second credentials that are subsequently provided to the remote access device to establish a second level of trust. The first credentials may comprise an encryption key that can be generated by the security component without having to retrieve information via a network, and the second credentials may comprise an attestation statement that is more trustworthy than the encryption key and that is generated based on a certificate retrieved from a remote security device (e.g., a certificate authority server).

19 Claims, 9 Drawing Sheets

(52) U.S. Cl.
CPC ........... *H04L 63/105* (2013.01); *H04W 12/06* (2013.01); *H04L 63/0815* (2013.01)

(56) References Cited

U.S. PATENT DOCUMENTS

| | | |
|---|---|---|
| 8,266,676 B2 | 9/2012 | Hardjono et al. |
| 2006/0256108 A1 | 11/2006 | Scaralata |
| 2008/0083039 A1* | 4/2008 | Choi ........................ G06F 21/57 726/27 |
| 2008/0271117 A1 | 10/2008 | Hamilton et al. |
| 2008/0320308 A1* | 12/2008 | Kostiainen ............ H04L 63/123 713/171 |
| 2009/0125996 A1* | 5/2009 | Guccione ............ H04L 63/0853 726/6 |
| 2009/0271618 A1* | 10/2009 | Camenisch ........... G06F 21/445 713/155 |
| 2010/0040234 A1* | 2/2010 | Alrabady ................. H04L 9/321 380/278 |
| 2010/0082991 A1* | 4/2010 | Baldwin ................. H04L 9/083 713/176 |
| 2011/0010543 A1 | 1/2011 | Schmidt et al. |
| 2011/0067095 A1* | 3/2011 | Leicher ................... H04L 63/06 726/10 |
| 2011/0154501 A1 | 6/2011 | Banginwar et al. |
| 2011/0302638 A1* | 12/2011 | Cha ........................ G06F 21/57 726/6 |
| 2012/0072731 A1 | 3/2012 | Winograd et al. |
| 2012/0246470 A1* | 9/2012 | Nicolson ................ G06F 21/57 713/158 |
| 2013/0174222 A1* | 7/2013 | Ogle ....................... G06F 21/31 726/3 |
| 2014/0006776 A1 | 1/2014 | Scott-Nash et al. |
| 2014/0089660 A1 | 3/2014 | Sarangshar et al. |

OTHER PUBLICATIONS

Chen, et al., "Property-Based Attestation without a Trusted Third Party", In Proceedings of the 11th international conference on Information Security, Sep. 15, 2008, pp. 31-46.

Chuan, et al., "Towards a Practical and Scalable Trusted Software Dissemination System", In Journal of Convergence, vol. 2, No. 1, Jun. 2011, pp. 53-60.

Greveler, et al., "Direct Anonymous Attestation: Enhancing Cloud Service User Privacy", In Proceedings of the 2011 Confederated international conference of On the move to meaningful internet systems, vol. Part II, Oct. 17, 2011, 11 pages.

McGill, Kathleen N., "Trusted Mobile Devices: Requirements for a Mobile Trusted Platform Module", In Proceedings of Johns Hopkins Apl Technical Digest, vol. 32, No. 2, Sep. 2013, pp. 544-554.

Smyth, et al., "Direct Anonymous Attestation (DAA): Ensuring Privacy with Corrupt Administrators", In Proceedings of the 4th European conference on Security and privacy in ad-hoc and sensor networks, Jul. 2, 2007, pp. 218-231.

PCT Search Report & Writtin Opinion for Application No. PCT/US2015/050310, mailed on Dec. 14, 2015, 12 pages.

"International Preliminary Report on Patentability Issued in PCT Application No. PCT/US2015/050310", Mailed Date: Aug. 1, 2016, 6 Pages.

* cited by examiner

EFFICIENT AND RELIABLE ATTESTATION

PRIORITY APPLICATION

This application claims the benefit of and priority to U.S. Provisional Application No. 62/051,882, filed Sep. 17, 2014, the entire contents of which are incorporated herein by reference.

BACKGROUND

A computing platform (e.g., a computing device) uses an attestation protocol to establish trust with a remote entity (e.g., a remote server). An attestation protocol is implemented to present evidence to prove to the remote entity that the computing platform includes platform characteristics that are trustworthy. Existing attestation protocols require a manufacturer certificate that is usable to generate or create the evidence. Typically, the manufacturer certificate must be retrieved from a certificate authority, and therefore, requires a network connection. Accordingly, the certificate used to generate or create the evidence may not readily be available to the computing platform if the manufacturer certificate has not yet been retrieved.

SUMMARY

This application describes delayed attestation. A computing device, or a security component of a computing device, implements delayed attestation by initially providing first credentials to a remote access device to establish a first level of trust with the remote access device. The first credentials may be provided before or while the computing device or the security component is obtaining security information from a remote security device that is used to generate second credentials that are subsequently provided to the remote access device to establish a second level of trust with the remote access device (e.g., upgrade the computing device from the first level to the second level of trust). The first credentials may comprise an encryption key that can be generated by the security component without having to retrieve information via a network, and the second credentials may comprise an attestation statement that is more trustworthy than the encryption key and that is generated based on a certificate retrieved from a remote security device (e.g., a certificate authority server). Accordingly, the remote access device may initially allow the computing device to access less secure content and functionality in association with the established first level of trust and then allow the computing device to access more secure content and functionality in accordance with the established second level of trust.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, algorithms, components, modules, and/or technique(s) as permitted by the context above and throughout the document.

BRIEF DESCRIPTION OF DRAWINGS

The detailed description is presented with reference to accompanying figures. In the figures, the left-most digit(s) of a reference number identifies the figure in which the reference number first appears. The use of the same reference numbers in different figures indicates similar or identical items.

DETAILED DESCRIPTION

By separately providing the first credentials and the second credentials, components of the computing device (e.g., an operation system, a browser, an application, etc.) are able to execute a user flow (e.g., a process or a function based on a user instruction) without having to wait for the security component to establish a network connection with a certificate authority server so that a certificate can be retrieved. As discussed above, using existing attestation protocols, the certificate has to be retrieved over a network before the computing device can be authenticated so that it can access content and functionality, e.g., via a server. Consequently, the second credentials that are more trustworthy than the first credentials may be unavailable to the computing device, e.g., for a temporary period of time after a first boot sequence of the computing device, and thus, the computing device may be unable to execute functions (e.g., that require remote authentication) which a user of the computing device desires to be executed.

The techniques discussed herein implement delayed attestation so that the computing device is able to first access limited content and limited functionality (e.g., during a first period of time) while the computing device is retrieving a certificate usable to subsequently access additional content and additional functionality that is more secure and/or more sensitive compared to the limited content and the limited functionality. Consequently, a user does not have to wait for the computing device to retrieve a certificate over a network before executing particular functions, e.g., that do not involve secure or sensitive information. Moreover, the techniques discussed herein pre-generate a pool of encryption keys to avoid delays associated with key generation. Even further, the techniques discussed herein maintain separate attestation material for different accounts registered to, or set up in/on, the computing device.

Figure 1:
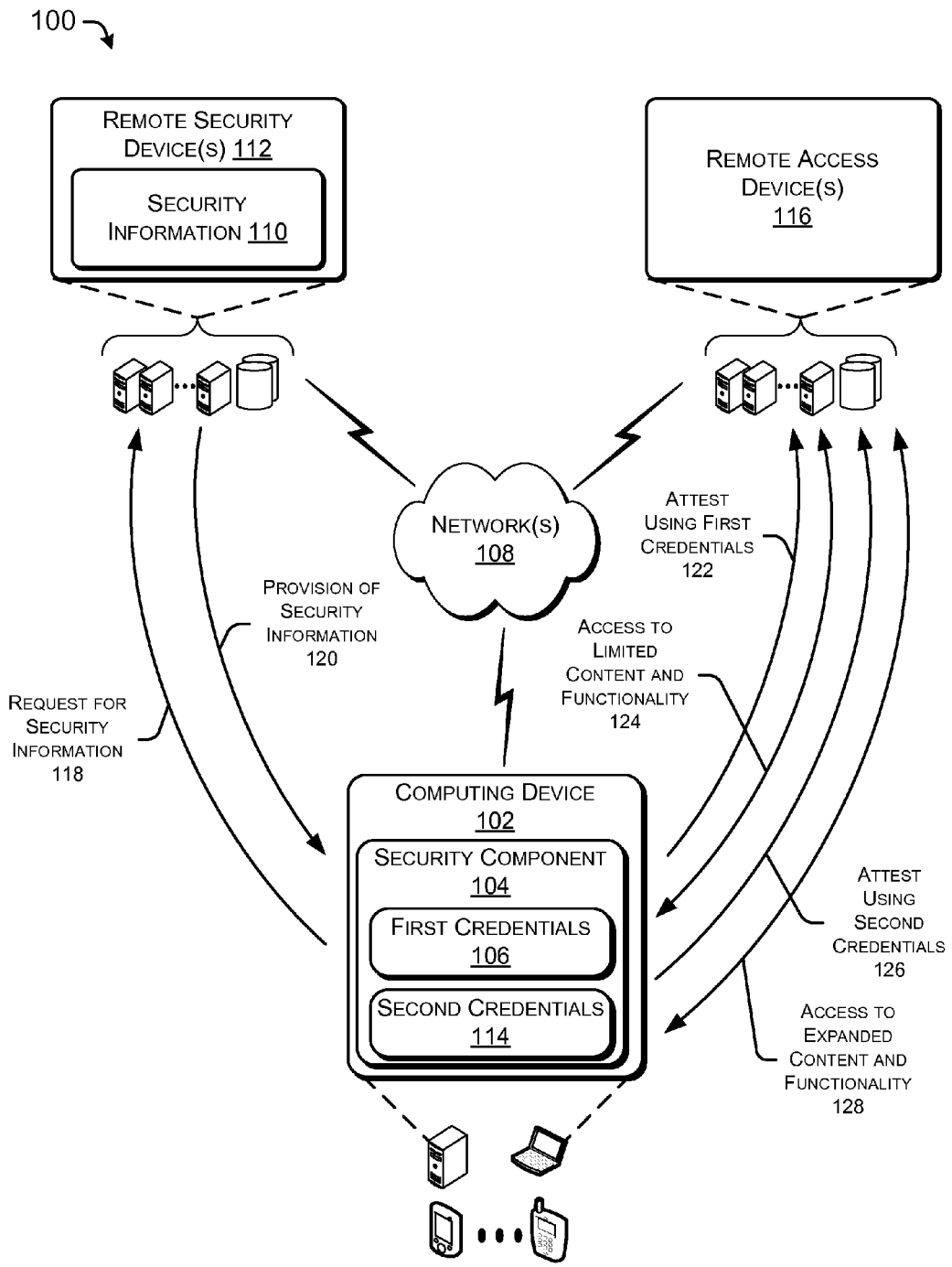
FIG. 1 illustrates an example environment in which a computing device implements delayed attestation by initially providing first credentials and subsequently providing second credentials that are more trustworthy than the first credentials.

FIG. 1 illustrates an example environment 100 in which a computing platform (e.g., a computing device 102) uses the techniques discussed herein to implement delayed attestation. The computing device 102 includes a security component 104. The security component 104 may be a component of the computing device 102 that is configured to generate credentials that are useable by the computing device 102 as evidence or proof that the operational hardware and/or the operational software of the computing device 102 is secure and trustworthy. For example, the security component 104 may comprise a specialized chip configured separately from other components of the computing device and configured to generate and store credentials (e.g., encryption keys, attestation statements, etc.) that are specific to the other components of the computing device 102, e.g., an operating system or host system of the computing device 102. The credentials may be provided to the other components of the computing device 102 so that they can be used for hardware authentication. In some examples, the security component 104 may present the credentials to other devices (e.g., external devices, remote devices, etc.) on behalf of other components of the computing device 102 (e.g., an operating system, a web browser, an application, etc.).

The security component 104 is configured to generate first credentials 106 independent of, or without, having to use network communications. The first credentials 106 may be provided to, or presented on behalf of, other components of the computing device 102 so that they can be used to establish a first level of trust with remote entities. For instance, the first credentials 106 may be used to initially register the computing device 102 with a remote device. In various examples, the first credentials 106 may include encryption keys that are capable of being generated by, and within, the security component 104 (e.g., without having to use network communications). Thus, the encryption keys may include one or more of an asymmetric key pair, an RSA (Rivest-Shamir-Adleman) key, an Endorsement Key (EK), a Storage Root Key (SRK), an Attestation Identity Key (AIK), and so forth.

As discussed above, to complete configuration and fully ready itself, the security component 104 is also configured to retrieve, via use of one or more networks 108 and/or other components of the computing device 102 (e.g., a network interface), security information 110 stored on a remote system, such as one or more remote security device(s) 112 (referred to herein as a remote security device 112). The security component 104 is configured to use the retrieved security information 110 to generate second credentials 114. Accordingly, the remote security device 112 may be a trusted third party such as a private certificate authority and the retrieved security information 110 may include a certificate. To retrieve the certificate, the security component 104 may present information (e.g., an AIK, a pre-configured endorsement certificate, etc.) to the remote security device 112 so that the remote security device 112 can validate the information and subsequently and securely issue the certificate to the security component 104. The security component 104 may use the retrieved certificate to "certify" the first credentials 106, thereby producing the second credentials 114 (e.g., cryptographically signed attestation evidence or an "attestation statement") that are useable to establish a second level of trust that is more trustworthy than the first level of trust. The second credentials 114 may be used to validate or prove, to remote entities, that the operational state of a computing platform is trustworthy and secure (e.g., the components of the computing device 102 have not been compromised by unauthorized firmware or unauthorized software modification). In one example implementation, the security component 104 may retrieve the security information 110 in association with Direct Anonymous Attestation (DAA), which is a cryptographic protocol that enables the remote security device 112 to issue, via the one or more networks 108, the security information 110 (e.g., a certificate) to the security component 104. In some examples, the remote security device 112 may include a server or other computing device that operates within a network service (e.g., a cloud service). Accordingly, the network(s) 108 may include the Internet, a Mobile Telephone Network (MTN) or other various communication technologies.

As discussed above, the remote security device 112 may be a device (e.g., a certificate authority server) that is maintained or operated by a manufacturer of the security component 104 and/or the computing device 102. Thus, the security component 104 may be configured to access the remote security device 112 for security purposes and so that it can fully configure and ready itself to perform appropriate device security functions. In various examples, the security component 104 may access the remote security device 112 in response to a particular event. The particular event may include, but is not limited to: a first boot sequence of the computing device 102, a factory reset of the computing device 102, a re-configuration of the security component 102 in response to a security vulnerability, a first user log-in to the computing device 102, etc.

As mentioned above, there may be some scenarios where components of the computing device 102 are instructed, or required, to access one or more remote access devices 116 (referred to herein as a remote access device 116) before the security component 104 has retrieved the security information 110 from the remote security device 112 and/or before the security component 104 fully configures itself so that it has the capability of generating the second credentials 114, which, upon provision to a remote entity, are more trustworthy than the first credentials 106 at least because of the retrieved security information 110 (e.g., a certificate used to generate an attestation statement).

Accordingly, FIG. 1 illustrates interactions to implement delayed attestation so that components of the computing device 102 may access content and functionality of the remote access device 116 before the security component 104 has retrieved the security information 110. Stated another way, execution of user flows (e.g., processes implemented in response to user instructions) is not delayed during a temporary time period when the second credentials 114 are unavailable (e.g., the security component 104 is unable to generate the second credentials 114 because it is in the process of using network communications to retrieve the certificate). The interactions illustrated in FIG. 1 occur between (i) the computing device 102 and the remote security device 112 and (ii) the computing device 102 and the remote access device 116. As referenced by 118, the security component and/or the computing device 102 send a request for the security information 110 to the remote security device 112. The request may include some information that the remote security device 112 may use to validate the request to ensure that the security information 110 is being issued to the correct device. In response to receiving the request and as referenced by 120, the remote security device 112 provides the requested security information 110 to the security component 104 and/or the computing device 102, e.g., so that it can be used by the security component 104 to generate the second credentials 114. As referenced by 122, the security component 104 and/or the computing device 102 may initially provide the first credentials 106 to the remote access device 116 to prove, or attest, itself. The security component 104 and/or the computing device 102 may attest using the first credentials 106 because the security component 104 has not yet been afforded enough time to fully configure itself using the network communications by: sending the request for the security information 110 to the remote security device 112, being provided with the requested security information 110, and/or using the retrieved security information 110 to generate the second credentials 114. Stated another way, the second credentials 114 that are more trustworthy than the first credentials 106 and that establish a higher level of trust with remote devices may be unavailable to components of the computing device 102 for a temporary period of time (e.g., sixty seconds, ninety seconds, five minutes, ten minutes, etc.) after a particular event occurs because network communications have to be established and used to retrieve the security information 110 useable to generate the second credentials 114. However, in the meantime, the security component 104 is configured to generate and/or provide the first credentials 106 independent of, or without, network communications.

Since the first credentials 106 are less trustworthy compared to the second credentials 114, the remote access device 116 may initially only allow the computing device 102 to access limited content and/or limited functionality, as referenced by 124. Then, at a later time, after the security component 104 is able to generate the second credentials 114, the computing device 102 may attest using the second credentials 114, as referenced by 126. In response, the remote access device 116 may subsequently allow the computing device to access expanded (e.g., additional) content and/or expanded functionality, as referenced by 128.

As a result of the second credentials 114 being more trustworthy than the first credentials 106, the expanded content and/or the expanded functionality may be more sensitive or secure compared to the limited content and/or the limited functionality, and therefore, the limited content and/or the limited functionality may be associated with a first level of security and the expanded content and/or the expanded functionality may be associated with a second level of security that is different than the first level of security and that provides more protection. Stated another way, the remote access device 116 may be configured to associate the first credentials 106 and second credentials 114 with different levels of trust (e.g., one less trustworthy compared to another that is more trustworthy), and the remote access device 116 may act on the different levels of trust in a manner that protects or secures information differently (e.g., more sensitive content and more sensitive functionality may be associated with a higher level of security or protection).

Figure 2:
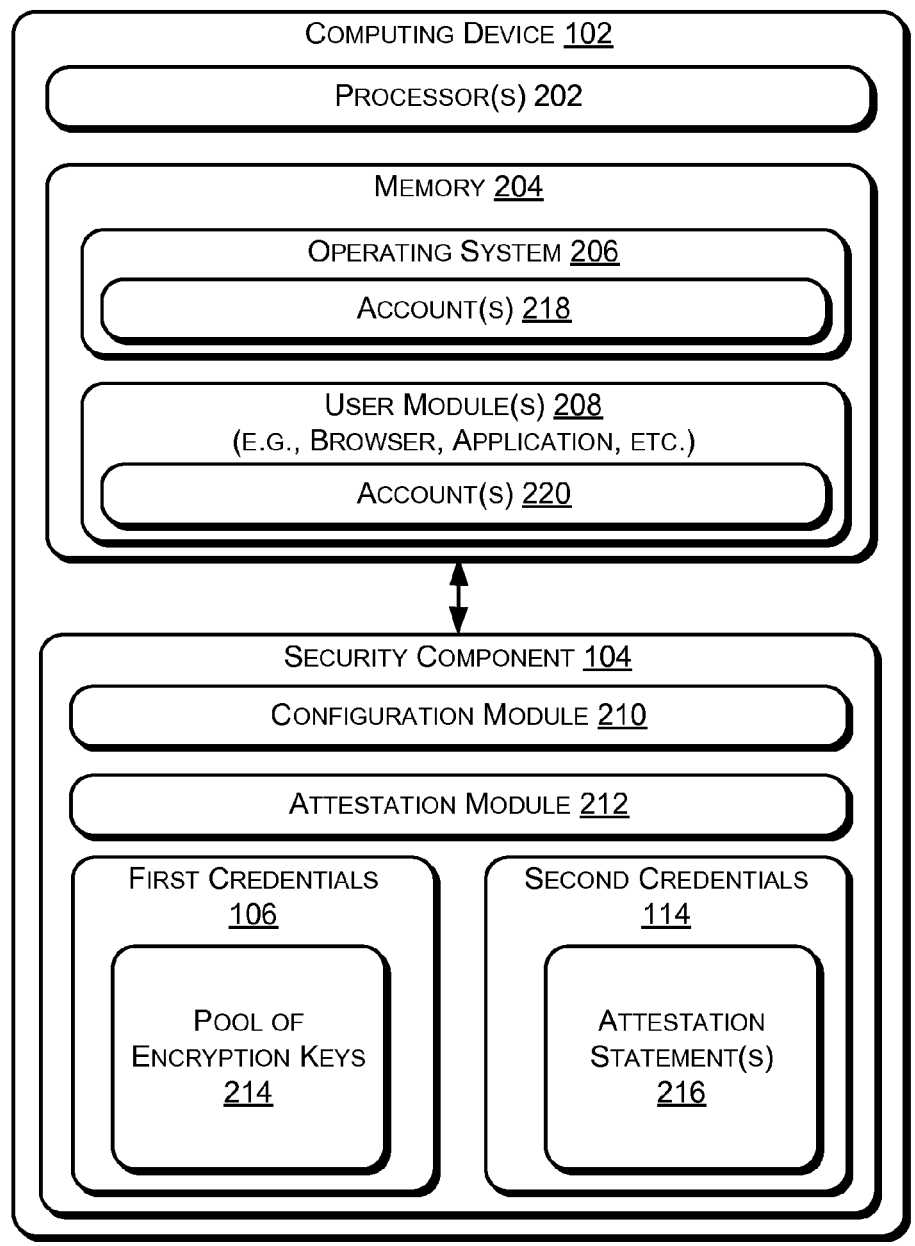
FIG. 2 illustrates a more detailed view of an example computing device that generates and uses the first credentials and the second credentials to implement delayed attestation.

FIG. 2 illustrates a more detailed view 200 of an example computing device 102 that generates and uses the first credentials 106 and the second credentials 114 to implement delayed attestation. The computing device 102 may include any one of a variety of devices, including portable devices or stationary devices. For instance, the computing device 102 may comprise a smart phone, a mobile phone, a personal digital assistant (PDA), an electronic book device, a wearable device (e.g., a smartwatch, electronic glasses, etc.), a laptop computer, a desktop computer, a tablet computer, a portable computer, a gaming console, a personal media player device, a server computer device or any other device.

Therefore, the computing device 102 may include one or more processors 202 and memory 204. The processor(s) 202 may be a single processing unit or a number of units, each of which could include multiple different processing units. The processor(s) may include a microprocessor, a microcomputer, a microcontroller, a digital signal processor, a central processing unit (CPU), a graphics processing unit (GPU), etc. Alternatively, or in addition, some or all of the techniques described herein can be performed, at least in part, by one or more hardware logic components. For example, and without limitation, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), other logic circuitry, a system on chip (SoC), and/or any other devices that perform operations. Among other capabilities, the processor(s) 202 may be configured to fetch and execute computer-readable instructions stored in the memory 204.

The memory 204 may include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, phase change memory (PRAM), static random-access memory (SRAM), dynamic random-access memory (DRAM), other types of random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

The memory 204 may include an operating system 206 configured to manage hardware and services within and coupled to the computing device 102 for the benefit of other components and other devices. For instance, other components of the computing device 102 may include user module(s) 208 such as a browser (e.g., a mobile web browser) or an application (e.g., an "app" configured on the computing device 102). As discussed above, the operating system 206 and/or the user module(s) 208 may be configured to use or access the security component 104 for security purposes (e.g., authentication, attestation, etc.). For example, the operating system 206 and/or the user module(s) 208 may request that the security component 104 generate and/or provide "material" (e.g., credentials) that can be used to attest the computing device 102. In response, the security component 104 may provide the first credentials 106 or the second credentials 114 (if available) to the other components so that the other components can present them to a remote entity (e.g., a remote access device 112). In some instances, the security component 104 may present the first credentials 106 or the second credentials 114 to the remote entity on behalf of the other components of the computing device 102.

In various examples, the security component 104 comprises a specialized chip. For instance, the security component 104 may be a Trusted Platform Module (TPM). Therefore, the security component 104 may include a cryptographic processor, memory to store security information (e.g., encryption keys, certificates, etc.), and secured input/output interfaces to enable interaction with other components of the computing device 102. To this end, the security component 104 may also be referred to as a security device. Moreover, the security component 104 may include a configuration module 210 and an attestation module 212. As used herein, the term "module" is intended to represent example divisions of executable instructions for purposes of discussion, and is not intended to represent any type of requirement or required method, manner or organization. Accordingly, while various "modules" are discussed, their functionality and/or similar functionality could be arranged differently (e.g., combined into a fewer number of modules, broken into a larger number of modules, etc.). Further, while certain functions and modules may be described herein as being implemented by software and/or firmware executable on a processor, in other embodiments, any or all of the modules may be implemented in whole or in part by hardware (e.g., a specialized processing unit, etc.) to execute the described functions.

The configuration module 210 is configured to interact, e.g., cause interaction, with the remote security device 112 to retrieve the security information 110 and fully configure, or ready, the security component 104. Example interactions are described above with respect to FIG. 1. The attestation module 212 is configured to generate the first credentials 106 and the second credentials 114 and/or provide the first credentials 106 and the second credentials 114, e.g., to other components of the computing device 102 or on behalf of the other components of the computing device 102 upon request so that they can be used as attestation material.

In various examples, the attestation module 212 is configured to generate and maintain a pool of encryption keys 214. The pool of encryption keys 214 may be a fixed size such that if the attestation module 212 uses an encryption key from the pool in response to a request to provide attestation material, then the attestation module 212 may automatically generate another encryption key to add to the pool and to maintain the fixed size of the pool (e.g., ten encryption keys, twelve encryption keys, etc.). Consequently, the security component 104 is always ready to provide an already generated, or pre-generated, encryption key and delays associated with an amount of time it takes the security component 104 to generate an encryption key after receiving a request can be avoided. Stated another way, performance of the security component 104 is more efficient and improved because an encryption key can immediately be used to provide attestation material. Moreover, an encryption key from the pool of encryption keys 214 may be provided as first credentials 106 at a time when the security information 110 (e.g., a certificate) has not yet been retrieved, and therefore, the second credentials 114 are unavailable to the computing device 102. Or, an encryption key from the pool of encryption keys 214 may be signed using the retrieved security information 110 and provided as second credentials 114, e.g., in the form of an attestation statement 216.

In further examples, the attestation module 212 is configured to retrieve separate instances of security information 110 and generate separate instances of attestation material (e.g., the first credentials 106 and the second credentials 114) for separate accounts created for, or registered to or on, the computing device 102. Accordingly, in scenarios where multiple users separately use a same computing device, user privacy is preserved from one user account to another with respect to attestation. For instance, the operating system 206 may be configured to manage and operate different user accounts 218 (e.g., the OS may identify a user via a user ID, password, biometrics, and so forth). Moreover, the user module(s) 208 may be configured to manage and operate different user accounts 220 (e.g., a first email account for a first user and a second email account for a second user). In one example implementation, the attestation module 212 is configured to generate and provide separate attestation material based on a domain name of an account (e.g., "example1.com" vs. "example2.com"). Therefore, the attestation module 212 may implement separate attestation material to provide privacy, but also, to make the security component 104 more scalable such that a first attestation statement (e.g., one of attestation statements 216) used for a first user account (e.g., one of accounts 218 or accounts 220) is still secure and can still be used if a second attestation statement used for a second user account in some way becomes compromised. In some examples, a user may define a setting indicating that two accounts can be associated with the same attestation material.

Figure 3:
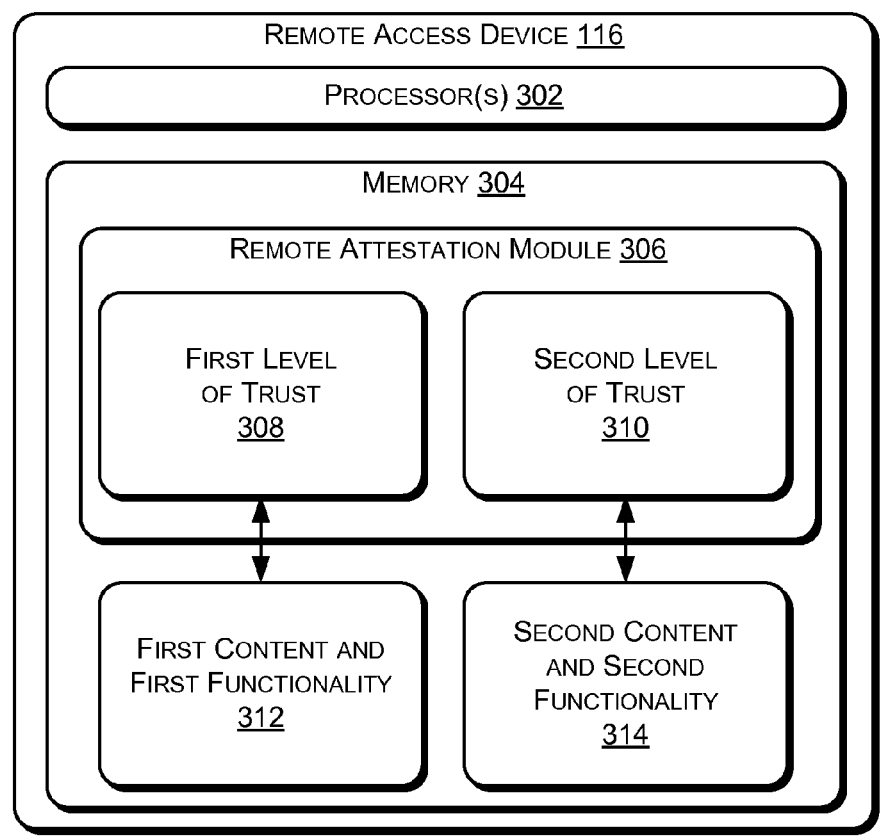
FIG. 3 illustrates a more detailed view of an example remote access device that acts upon the first credentials and the second credentials provided by a computing device to implement delayed attestation.

FIG. 3 illustrates a more detailed view 300 of an example remote access device 116. The remote access device 116 may include any one of a variety of devices, including portable devices or stationary devices. For instance, the remote access device 116 may comprise a server or another computing device that operates within a network service (e.g., a cloud service, a content provider, a service provider, a server farm, etc. Accordingly, the remote access device 116 is configured to communicate with, and/or receive credentials from, the security component 104 and/or the computing device 102 via one or more network(s) 108, such as the Internet (e.g., a Wi-Fi connection), a Mobile Telephone Network (MTN) or other various communication technologies.

The remote access device 116 includes one or more processor(s) 302 and memory 304. Example types of processor(s) 302 and memory 304 are discussed above with respect to the processor(s) 202 and the memory 204 of FIG. 2. The memory 304 includes a remote attestation module 306 configured to initially receive the first credentials 106 and to subsequently receive the second credentials 114 from the computing device 102. The remote attestation module 306 authenticates the computing device 102 using either the first credentials 106 and/or the second credentials 114, and consequently, establishes either a first level of trust 308 based on the first credentials 106 or a second level of trust 310 based on the second credentials 114. As discussed above, the remote attestation module 306 associates the first level of trust 308 with first content and/or first functionality 312 and the remote attestation module 306 associates the second level of trust 310 with second content and/or second functionality 314. The first content and/or the first functionality 312 may be limited because the first level of trust 308 is established using the first credentials 106 that are less trustworthy compared to the second credentials 114. Accordingly, the first content and/or the first functionality 312 may be less secure compared to the second content and/or the second functionality 314. Upon establishing the second level of trust 310 using the more trustworthy second credentials 114 (e.g., an attestation statement), the remote access device 116 provides access to expanded functionality and/or expanded content that is more secure (e.g., the second content and/or second functionality 314).

To further illustrate, in a first example, the remote access device 116 may be a social network server configured to initially accept the first credentials 106 to authenticate the computing device 102 and to subsequently accept the second credentials 114 to upgrade the authentication of the computing device 102 from the first level of trust 308 to a second level of trust 310. In between the acceptance of the first credentials 106 and the second credentials 114, the social network server may allow the user to access his or her account and to view his or her social network feed that includes updates or posts from friends (e.g., the first content and/or the first functionality 312) but may not allow the user to change any profile settings (e.g., the second content and/or the second functionality 314). Rather, the social network server may require that the second, and more secure, level of trust 310 be established using the second credentials 114 to enable the computing device 102 to change profile settings for a user account. As discussed above, a user of the computing device 102 may have recently purchased the computing device 102 at a retail store and may want to access his or her social network page while the computing device 102 is going through an activation and setup process. At a time when a request to access a social network page is being processed, the security component 104 may have not yet retrieved the security information 110 via the networks 108, and therefore, the second credentials 114 may be unavailable to the social network app or the web browser.

In a second example, the remote access device 116 may be an online retail server. In between the acceptance of the first credentials 106 and the second credentials 114, the online retail server may allow the user to log-in and view items for purchase based on stored user interests (e.g., the first content and/or the first functionality 312) but may not allow the user to make a purchase or change payment settings (e.g., the second content and/or the second functionality 314). Rather, the online retail server may require that the second, and more secure, level of trust 310 be established using the second credentials 114 to enable the computing device 102 to implement a purchase or change a payment setting.

In a third example, the remote access device 116 may be one of various cloud servers that assist with backing up and synching downloaded content (e.g., photos, videos, payment information, etc.) and functionality (e.g., apps). For instance, a user may upgrade from a previous computing device (e.g., an older smartphone) to a new computing device, e.g., computing device 102. As part of the upgrade, the user may select and purchase the new computing device and want the content and functionality from the previous computing device conveniently placed on the new computing device immediately after the purchase. Upon a first boot of the new computing device, the security component 104 may not be ready to generate and provide the second credentials 114, as discussed above. Consequently, the remote access device 116 that supports device synchronization may be configured to act upon different levels of trust such that the first content and/or the first functionality 312 (e.g., game apps) may be provided during a device synchronization process based on the first credentials 106, and at a later time the second content and/or the second functionality 314 (e.g., payment apps, health information apps, etc.) that is more secure and/or more sensitive than the first content and/or the first functionality 312 may be provided during the device synchronization process based on the second credentials 114.

As is evident in the three examples in the preceding paragraphs, the computing device 102 is still able to execute user processes even though the security component 104, for a period of time, is not configured to generate and/or to provide the second credentials 114. Stated another way, if the second credentials 114 are unavailable, the techniques described herein are capable of implementing delayed attestation in which a user process such as a remote access may be executed by the computing device 102 using less trustworthy attestation material until more trustworthy attestation material becomes available.

The documents incorporated by reference in this paragraph describe, among other things, ways to detect fraudulent certificates which may be used in connection with the techniques described herein. The documents incorporated by reference in this paragraph also describe, among other things, implementing a secure processing model for authenticating processes and for specifying and enforcing permission restrictions on system resources. Accordingly, U.S. patent application Ser. No. 14/449,716, filed Aug. 1, 2014, entitled "CERTIFICATE EVALUATION FOR CERTIFICATE AUTHORITY REPUTATION ADVISING," is incorporated by reference herein in its entirety. U.S. patent application Ser. No. 14/449,684, filed Aug. 1, 2014, entitled "ADVISING CLIENTS ABOUT CERTIFICATE AUTHORITY TRUST," is incorporated by reference herein in its entirety. U.S. patent application Ser. No. 14/020,491, filed Sep. 6, 2013, entitled "CERTIFICATING AUTHORITY TRUST EVALUATION," is incorporated by reference herein in its entirety. U.S. Provisional Patent Application Ser. No. 61/830,121, filed Jun. 2, 2013, entitled "CERTIFICATING AUTHORITY TRUST EVALUATION," is incorporated by reference herein in its entirety. U.S. patent application Ser. No. 13/925,703, filed Jun. 24, 2013, entitled "PROCESS AUTHENTICATION AND RESOURCE PERMISSIONS," is incorporated by reference herein in its entirety.

FIGS. 4-9 individually illustrate an example process for employing the techniques described herein. For ease of illustration, the example processes are described as being performed in the environment of FIG. 1, FIG. 2, FIG. 3, or any combination of FIGS. 1-3. For example, one or more of the individual operations of the example processes may be performed by the computing device 102, by the security component 104 of the computing device 102, or by the remote access device 116. However, processes may be performed in other environments and by other devices as well.

The example processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, configure a device to perform the recited operations. Generally, computer-executable instructions include routines, programs, objects, components, data structures, and the like that perform particular functions. The order in which the operations are described is not intended to be construed as a limitation, and any number of the described operations can be combined in any order and/or in parallel to implement the process. Further, any of the individual operations may be omitted.

Figure 4:
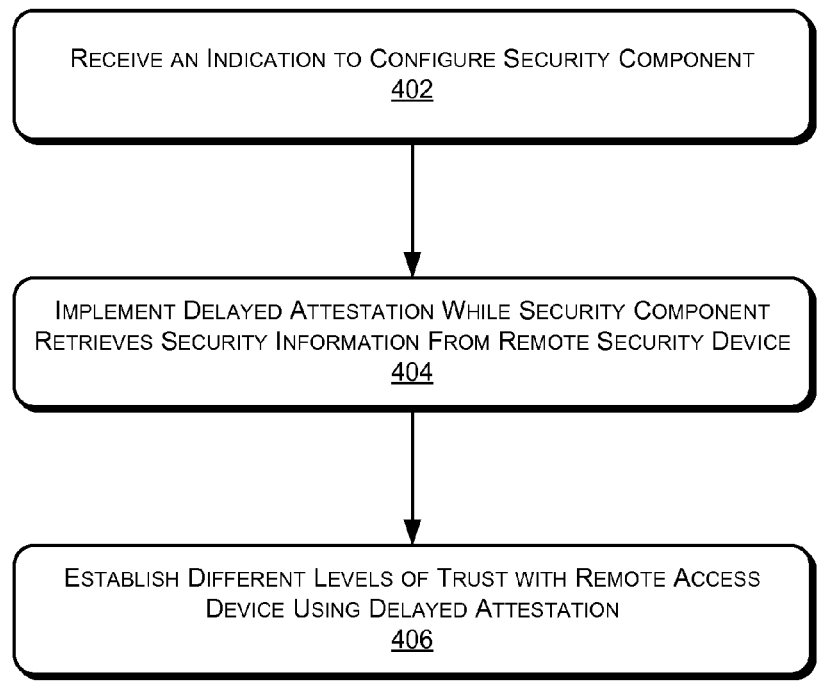
FIG. 4 illustrates an example process that implements delayed attestation in response to a particular event.

FIG. 4 illustrates an example process 400 that implements delayed attestation in response to a particular event.

At 402, an indication to configure the security component 104 is received. For instance, the indication may be provided to the security component 104 by another component (e.g., the operating system 206) of the computing device 102 in response to a particular event such as a first boot sequence (e.g., a user has recently purchased the computing device 102 from a retail store or a web site and has booted the computing device 102 for initial configuration and use). Accordingly, the security component 104 may initiate the process to completely configure and fully ready itself.

At 404, delayed attestation is implemented while the security component 104 retrieves security information 110 from a remote security device 112. For instance, implementation of the delayed attestation may include the computing device 102 initially using first and less trustworthy credentials 106 until second and more trustworthy credentials 114 are available to be provided by the security component 104 (e.g., after the security component 104 has completely configured and fully readied itself).

At 406, different levels of trust are established with a remote access device 116 using the delayed attestation. For instance, the computing device 102 may access the first content and/or the first functionality 312, that is limited and that is associated with a first level of security, for a period of time during which the second credentials 114 are temporarily unavailable. Then, once the second credentials 114 become available, the computing device 102 may be upgraded from the first level of trust 308 to the second level of trust 310 so that the second content and/or the second functionality 314, that is expanded and that is associated with a second level of security that provides more security and protection, may be accessed.

Figure 5:
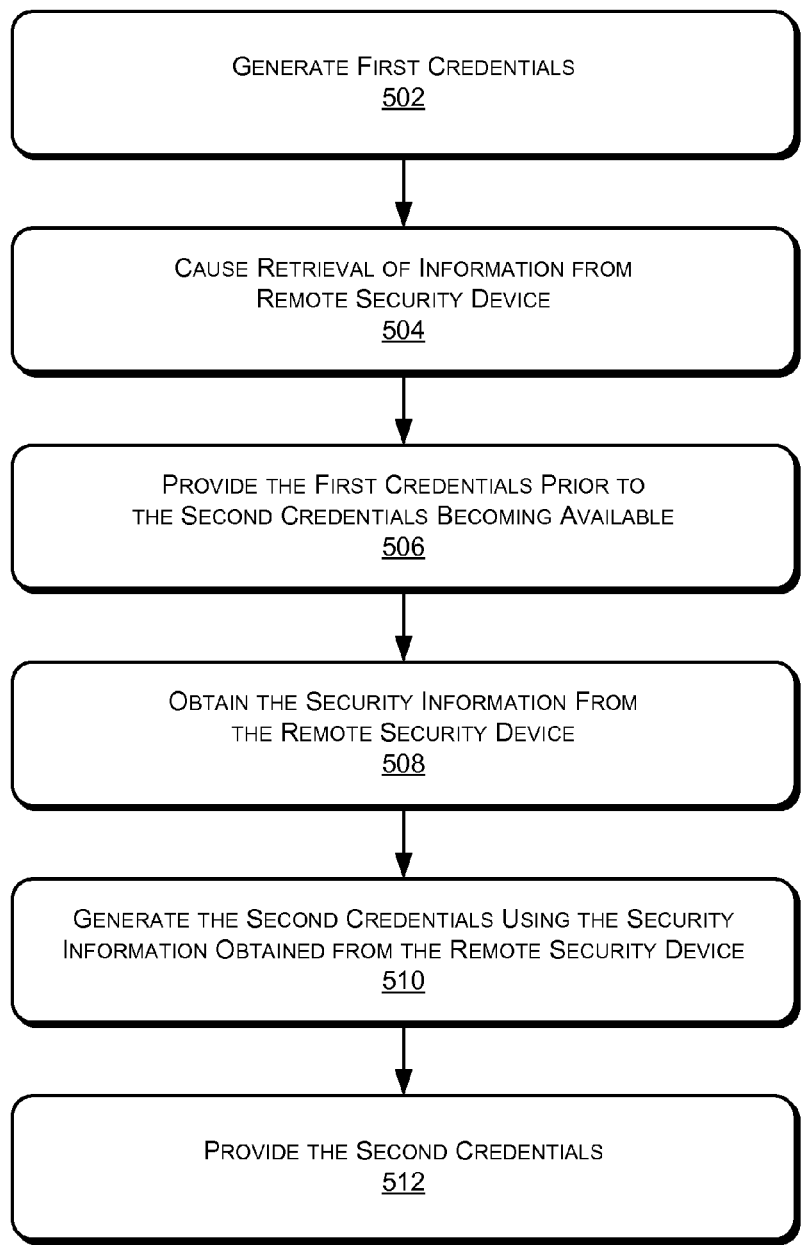
FIG. 5 illustrates an example process that describes the delayed attestation in more detail.

FIG. 5 illustrates an example process 500 that describes the delayed attestation in more detail.

At 502, the first credentials 106 are generated. For instance, the configuration module 210 of the security component 104 may generate the first credentials without having to use network communications and without having to access a remote security device 112. As discussed above, the first credentials 106 may include encryption keys that are capable of being generated by, and within, the security component 104, the encryption keys including, for example, one or more of an asymmetric key pair, an RSA key, an Endorsement Key (EK), a Storage Root Key (SRK), an Attestation Identity Key (AIK), and so forth.

At 504, the retrieval of the security information 110 from the remote security device 112 is caused. For instance, the configuration module 210 of the security component 104 may generate and send a request, e.g., via a network interface of the computing device 102, to the remote security device 112 (e.g., a certificate authority server maintained by the manufacturer of the security component 104 and/or the computing device 102). The request may include information (e.g., an AIK, a pre-configured endorsement certificate, etc.) that the remote security device 112 can use to validate the request so that the security information 110 (e.g., a certificate) can appropriately be issued to the security component 104 of the computing device 102.

At 506, the first credentials 106 are provided prior to the second credentials 114 becoming available. For instance, upon request, the attestation module 212 of the security component 104 may determine that the second credentials 114 (e.g., an attestation statement) are currently unavailable and/or incapable of being generated (e.g., due to lack of a manufacturer certificate), and therefore, the attestation module 212 of the security component 104 may provide the first credentials 106 to another component of the computing device 102 so that the other component can use the first credentials 106 to establish a first, and less trustworthy, level of trust 308 with a remote access device 116. In some instances, the attestation module 212 of the security component 104 may provide the first credentials to the remote access device 116 on behalf of the other component that requested credentials from the security component 104. In some examples, the first credentials 106 provided may be an encryption key from the pool of encryption keys 214.

At 508, the security information 110 is obtained from the remote security device 112. For instance, the remote security device 112 may validate the information included in the request and subsequently provide a certificate to the security component 104. Therefore, the security component 104 obtains the security information 110 from the remote security device 112 via the network(s) 108.

At 510, the second credentials 114 are generated (e.g., become available) using the security information 110 obtained from the remote security device 112. The security component 104 may use the retrieved certificate to "certify" the first credentials 106, thereby producing the second credentials 114 (e.g., an attestation statement).

At 512, the second credentials are provided so that they can be used to upgrade the device attestation from the first level of trust 308 to the second level of trust 310 that is more trustworthy than the first level of trust 308. Accordingly, the computing device 102 may be granted access to second content and/or second functionality 314 that is more secure compared to first content and/or first functionality 312 accessible via the first level of trust 308.

Figure 6:
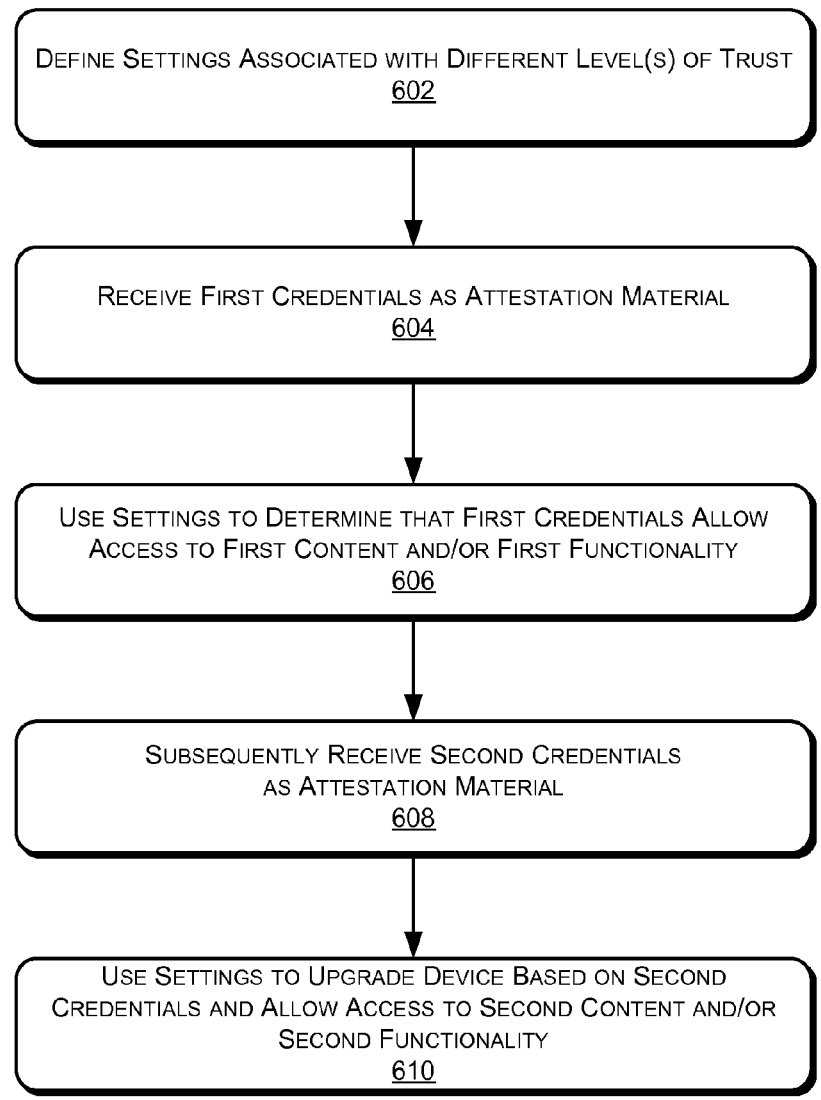
FIG. 6 illustrates an example process that provides access to content and functionality based on different levels of established trust.

FIG. 6 illustrates an example process 600 that provides access to content and functionality based on different levels of trust established. The example process 600 may be implemented at a remote access device 116.

At 602, settings associated with different levels of trust are defined. For instance, the remote attestation module 306 may evaluate or analyze content and/or functionality and determine a level of trust associated with the content and/or functionality based on a degree of sensitivity or importance. For example, types of content and/or functionality that may be more sensitive and important, and therefore, may require establishment of the second level of trust 310, may include payment information, health information, purchase actions, account settings, etc. In contract, types of content and/or functionality that may be less sensitive and important, and therefore, may only require establishment of the first level of trust 308, may include public information (e.g., news, weather, etc.), gaming information, and so forth.

At 604, the first credentials 106 are initially received as attestation material. For instance, the remote attestation module 306 may receive a request from the computing device 102 along with the first credentials 106, e.g., configured to register the computing device with the remote access device 116. The remote attestation module 306 may then use the first credentials 106 to initially verify the computing device 102.

At 606, the settings are used to determine that the first credentials 106 allow access to first content and/or first functionality 312 (e.g., limited access, less secure information, etc.). For instance, the remote attestation module 306 may enable or allow the computing device 102 to access the first content and/or the first functionality 312 in accordance with the established first level of trust 308.

At 608, the second credentials 114 are subsequently received as attestation material. For instance, after receiving the first request with the first credentials 106, the remote attestation module 306 may receive another request from the computing device 102 along with the second credentials 114. The other request may indicate to the remote access device 116 that more trustworthy attestation material (e.g., an attestation statement based on a retrieved certificate) has become available after the first credentials were initially provided, and therefore, the computing device 102 should be upgraded from the first level of trust 308 to the second level of trust 310.

At 610, the settings are used to determine that the second credentials 114 allow access to second content and/or second functionality 314 that is expanded and more secure compared to the first content and/or the first functionality 312. Accordingly, the attestation of the computing device 102 may be upgraded based on the second credentials 114.

Figure 7:
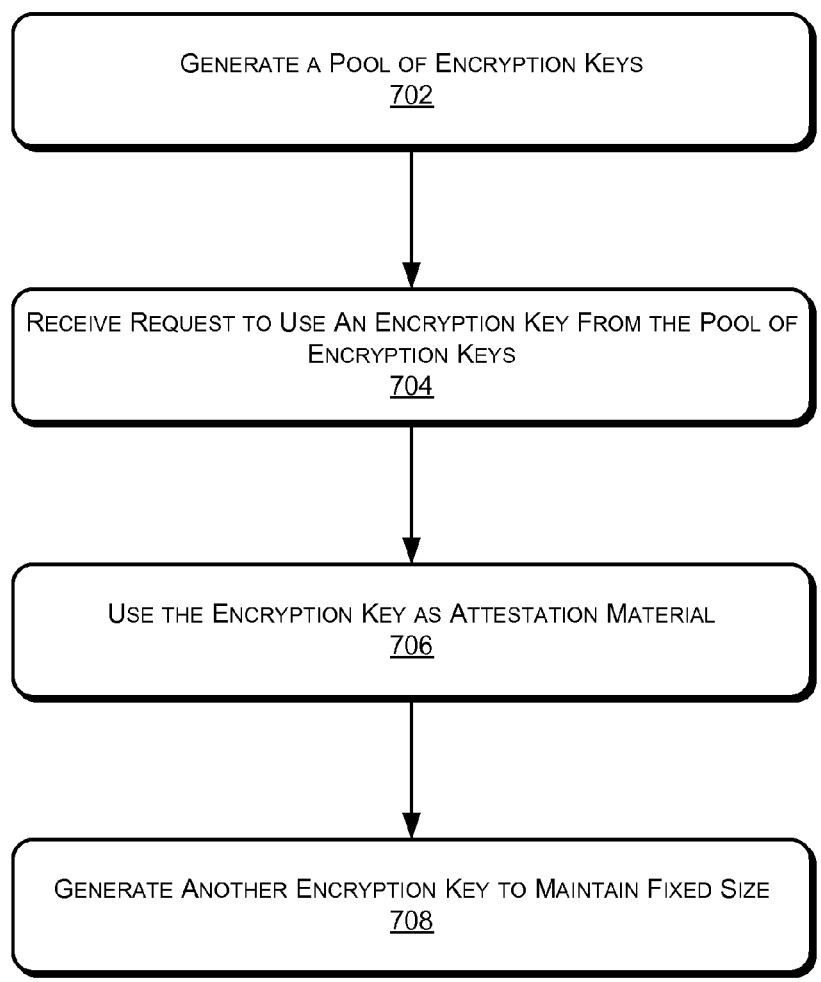
FIG. 7 illustrates an example process that maintains a pool of encryption keys of a fixed size, the encryption keys useable for attestation.

FIG. 7 illustrates an example process 700 that maintains a pool of encryption keys of a fixed size.

At 702, a pool of encryption keys is generated. For instance, the configuration module 210 of the security component 104 may generate encryption keys and add them to the pool of encryption keys prior to, and independent of, receiving requests for encryption keys from other components of the computing device 102. Stated another way, the configuration module 210 may pre-generate a pool of encryption keys, e.g., in response to a particular event such as a first device boot sequence.

At 704, a request to use an encryption key from the pool of encryption keys is received. For instance, an operating system 206 or a user module 208 may request an encryption key from the security component 104.

At 706, the encryption key is used as attestation material. For example, the configuration module 210 may use an encryption key from the pool of encryption keys to provide the first credentials 106. In another example, the configuration module 210 may use an encryption key from the pool of encryption keys to generate and to provide the second credentials 114 (e.g., sign the encryption key with a retrieved certificate).

At 708, another encryption key is generated to maintain a fixed size of the pool of encryption keys. For instance, the configuration module 210 may be configured to maintain the fixed size of the pool so that an encryption key is always ready to be provided in response to a request received from another component of the computing device 102. Consequently, delays caused by an amount of time it takes the security component 104 to generate an encryption key in response to receiving a request can be avoided and the efficiency of the security component 104 can be improved.

Figure 8:
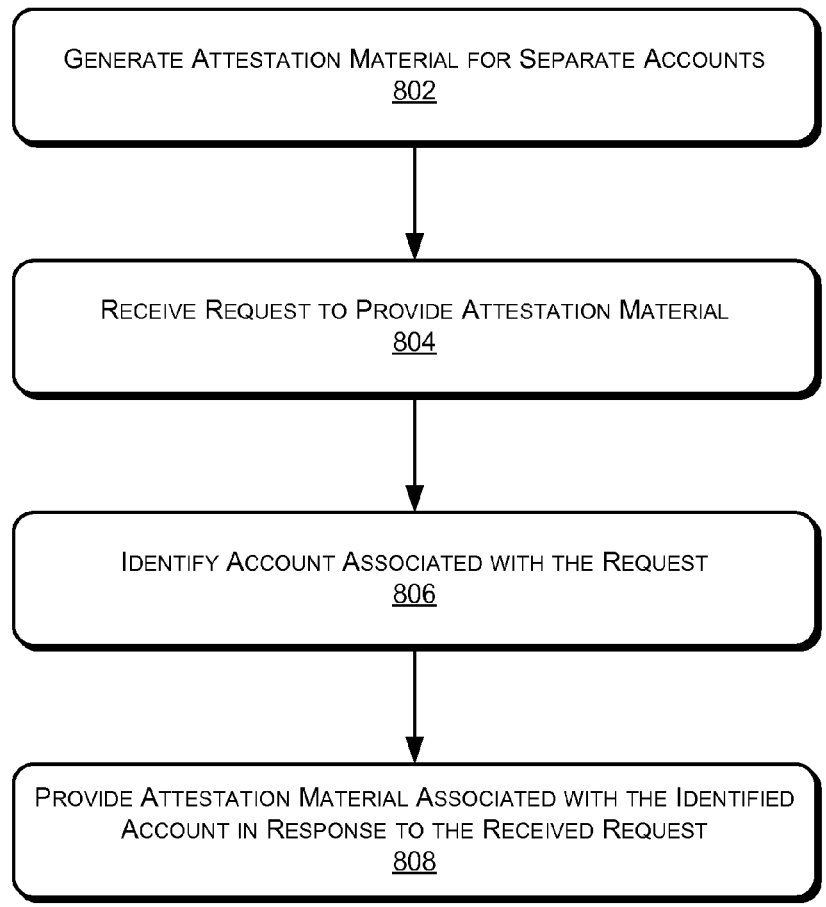
FIG. 8 illustrates an example process that generates separate attestation material for separate accounts created for, or registered to/on, the computing device.

FIG. 8 illustrates an example process 800 that generates separate attestation material (e.g., the first credentials 106 and the second credentials 114) for separate accounts created for, or registered to/on, the computing device 102.

At 802, attestation material for separate accounts is generated. For instance, the attestation module 212 may be provided with, or may access, various account identifiers of accounts for which separate attestation material is requested. The accounts may be operating system accounts 218 and/or user module accounts 220 associated with various users that use the computing device.

At 804, a request to provide attestation material is received. For instance, the attestation module 212 may receive a request from the operating system 206 or a user module 208, the request being based on a user instruction (e.g., user input).

At 806, an account associated with the request is identified. For instance, the attestation module 212 may determine that the operating system 206 or the user module 208 is currently executing on behalf of a particular account (e.g., a particular user is logged-in and using the device).

At 808, the attestation material associated with the identified account is provided in response to the received request. For instance, the attestation module 212 may provide an attestation statement that was separately generated for the identified account, while not providing an attestation statement that was separately generated for a different account.

In various examples, implementation of the delayed attestation discussed above is performed automatically (e.g., as a background task). However, in alternative examples, implementation of the delayed attestation may involve user interaction and/or user approval.

Figure 9:
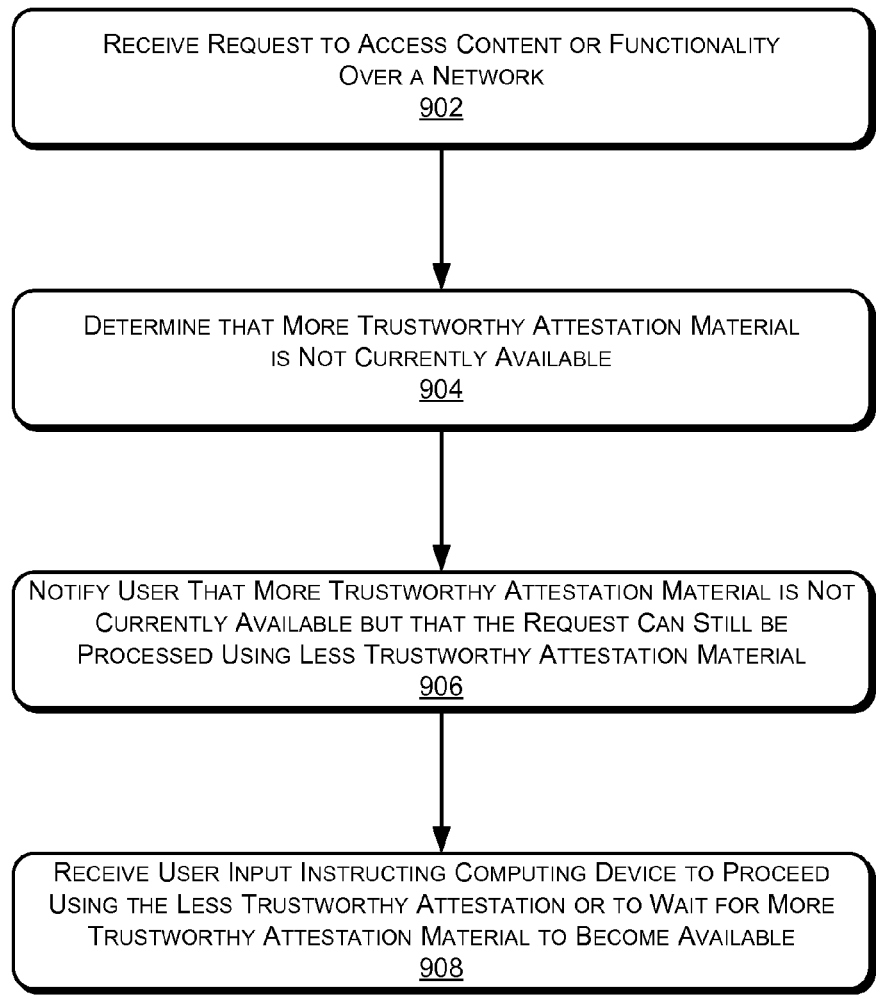
FIG. 9 illustrates an example process that notifies a user of delayed attestation and receives input on whether to use delayed attestation.

FIG. 9 illustrates an example process 900 that notifies a user of delayed attestation and receives input on whether to use delayed attestation.

At 902, a request to access content or functionality over a network is received. For instance, after purchasing a new smart phone, a user may activate a mobile web browser to view a particular web page (e.g., a news hub, a log-in page to view credit card information, etc.).

At 904, it is determined that more trustworthy attestation material (e.g., the second credentials 114) is not currently available. For instance, the web browser may be configured to request attestation material from the security component 104 and in response the web browser may be made aware that the more trustworthy attestation material (e.g., the second credentials 114) are currently unavailable but that less trustworthy attestation material (e.g., the first credentials 106) can be immediately provided to avoid a delay in the execution of the user flow.

At 906, a user is notified that the more trustworthy attestation material is not currently available but that the request can still be processed using the less trustworthy attestation material. For instance, the computing device 102 may output a prompt or warning via a display.

At 908, user input is received, the user input instructing the computing device to proceed using the less trustworthy attestation material or to wait for the more trustworthy attestation material to become available. Accordingly, the user is able to make an informed decision on whether they want to proceed with the less trustworthy attestation material.

Example Clauses

Example A, a computing device comprising: one or more processors; memory storing instructions that, when executed on the one or more processors, cause the computing device to: access at least one of first information or first functionality at the remote access device by providing first credentials to the remote access device; obtain security information from a remote security device that is different than the remote access device; generate, using the security information and subsequent to providing the first credentials to the remote access device, second credentials that are usable to access at least one of second information or second functionality at the remote access device; and access the at least one of the second information or the second functionality at the remote access device by providing the second credentials to the remote access device, the at least one of the second information or the second functionality having a different level of security than the at least one of the first information or the first functionality.

Example B, the computing device of Example A, wherein the first credentials are provided by a security component of the computing device in response to: receiving a request from a browser of the computing device or from an application of the computing device to execute a user flow, wherein the user flow includes authenticating to the remote access device; and a determination that the second credentials are temporarily unavailable, the provision of the first credentials enabling execution of the user flow without delay.

Example C, the computing device of Example A or Example B, wherein the instructions further cause the computing device to generate the first credentials, the generation of the first credentials being enabled independent of network communications.

Example D, the computing device of any one of Example A through Example C, wherein the security information comprises one or more manufacturer certificates usable to generate an attestation statement as the second credentials, the attestation statement configured to prove, to the remote access device, that the computing device is trustworthy and has not been compromised.

Example E, the computing device of any one of Example A through Example D, wherein the first credentials comprise an encryption key usable to register the computing device with the remote access device.

Example F, the computing device of Example E, wherein the instructions further cause the computing device to generate the encryption key as part of a pool of encryption keys prior to the generation of the second credentials.

Example G, the computing device of Example F, wherein the instructions further cause the computing device to maintain a fixed size of the pool of encryption keys such that a new encryption key is generated in response to the encryption key being used to register the computing device with the remote access device.

Example H, the computing device of any one of Example A through Example G, wherein the remote security device comprises a certificate authority that is associated with a manufacturer of at least one of the computing device or a security component of the computing device that generates the first credentials and the second credentials.

Example I, the computing device of any one of Example A through Example H, wherein the instructions further cause the computing device to retrieve the security information from the remote security device in response to a first boot of the computing device.

While Example A through Example I are described above with respect to a computing device, it is understood in the context of this document that the content of Example A through Example I may also be implemented via a system, computer storage media, a method, and/or a security device.

Example J, a security device comprising: at least one cryptographic processor; memory storing instructions that, when executed on the at least one cryptographic processor, cause the security device to: provide first credentials to establish a first level of trust between a computing device and a remote access device; obtain security information retrieved from a remote security device that is different than the remote access device; generate, using the security information and subsequent to providing the first credentials, second credentials that are usable to establish a second level of trust between the computing device and the remote access device, the second level of trust being more trustworthy than the first level of trust; and provide the second credentials to establish the second level of trust between the computing device and the remote access device.

Example K, the security device of Example J, wherein the instructions further cause the security device to provide, in response to receiving a request from a component of the computing device, the first credentials to the component of the computing device thereby enabling the component of the computing device to establish the first level of trust with the remote access device.

Example L, the security device of Example J, wherein the instructions further cause the security device to provide, in response to receiving a request from a component of the computing device, the first credentials to the remote access device to establish the first level of trust between the computing device and the remote access device.

Example M, the security device of any one of Example J through Example L, wherein the instructions further cause the security device to generate the first credentials without having to access information over a network.

Example N, the security device of any one of Example J through Example M, wherein the security information comprises one or more manufacturer certificates usable to generate an attestation statement as the second credentials, the attestation statement configured to prove, to the remote access device, that the computing device is trustworthy and has not been compromised.

Example O, the security device of any one of Example J through Example N, wherein the instructions further cause the security device to retrieve the security information from the remote security device in response to a first boot of the computing device.

Example P, the security device of any one of Example J through Example O, wherein the instructions further cause the security device to: generate separate attestation statements using the security information; and respectively associate the separate attestation statements with separate accounts registered to, or set up on, the computing device.

While Example J through Example P are described above with respect to a security device, it is understood in the context of this document that the content of Example J through Example P may also be implemented via a system, computer storage media, a method, and/or a computing device.

Example Q, a method comprising: providing, by a computing device, first credentials to a remote access device to establish a first level of trust with the remote access device; retrieving security information from a remote security device that is different than the remote access device; generating, using the security information and subsequent to providing the first credentials, second credentials that are usable to upgrade the computing device from the first level of trust to a second level of trust, the second level of trust being more trustworthy than the first level of trust; and providing the second credentials to the remote access device to upgrade the computing device from the first level of trust to the second level of trust.

Example R, the method of Example Q, further comprising determining, prior to providing the first credentials to the remote access device, that the second credentials are unavailable.

Example S, the method of Example Q or Example R, further comprising generating the first credentials independent of using network communications.

Example T, the method of any one of Example Q through Example S, wherein the security information comprises one or more manufacturer certificates usable to generate an attestation statement as the second credentials, the attestation statement configured to prove, to the remote access device, that the computing device is trustworthy and has not been compromised.

While Example Q through Example T are described above with respect to a method, it is understood in the context of this document that the content of Example Q through Example T may also be implemented via a system, computer storage media, a security device, and/or a computing device.

Example U, a system comprising: means for accessing at least one of first information or first functionality at the remote access device by providing first credentials to the remote access device; means for obtaining security information from a remote security device that is different than the remote access device; means for generating, using the security information and subsequent to providing the first credentials to the remote access device, second credentials that are usable to access at least one of second information or second functionality at the remote access device; and means for accessing the at least one of the second information or the second functionality at the remote access device by providing the second credentials to the remote access device, the at least one of the second information or the second functionality having a different level of security than the at least one of the first information or the first functionality.

Example V, the system of Example U, wherein the first credentials are provided in response to: receiving a request from a browser of the system or from an application of the system to execute a user flow, wherein the user flow includes authenticating to the remote access device; and a determination that the second credentials are temporarily unavailable, the provision of the first credentials enabling execution of the user flow without delay.

Example W, the system of Example U or Example V, means for generating the first credentials, wherein the generation of the first credentials is enabled independent of network communications.

Example X, the system of any one of Example U through Example W, wherein the security information comprises one or more manufacturer certificates usable to generate an attestation statement as the second credentials, the attestation statement configured to prove, to the remote access device, that the system is trustworthy and has not been compromised.

Example Y, the system of any one of Example U through Example X, wherein the first credentials comprise an encryption key usable to register the system with the remote access device.

Example Z, the system of Example Y, wherein the encryption key is generated as part of a pool of encryption keys prior to the generation of the second credentials.

Example AA, the system of Example Z, further comprising means for maintaining a fixed size of the pool of encryption keys such that a new encryption key is generated in response to the encryption key being used to register the system with the remote access device.

Example BB, the system of any one of Example U through Example AA, wherein the remote security device comprises a certificate authority that is associated with a manufacturer of the system that generates the first credentials and the second credentials.

Example CC, the system of any one of Example U through Example BB, wherein the means for obtaining retrieves the security information from the remote security device in response to a first boot of the system.

CONCLUSION

Although the present disclosure may use language that is specific to structural features and/or methodological operations, the disclosure is not limited to the specific features or operations described herein. Rather, the specific features and operations are disclosed as illustrative forms of implementing the disclosure.

What is claimed is:

1. A computing device comprising:
   one or more processors; and
   memory storing instructions that, when executed on the one or more processors, cause the computing device to:
      provide, to a security component of the computing device, a request to execute a user flow;
      receive, from the security component of the computing device and based at least in part on the request, first credentials based at least in part on a determination that second credentials are temporarily unavailable due to security information not yet being obtained from a remote security device;
      access at least one of first information or first functionality at a remote access device by providing the first credentials to the remote access device, the providing the first credentials enabling execution of the user flow without delay caused by the second credentials being temporarily unavailable;
      receive, from the security component of the computing device, the second credentials, wherein the second credentials are generated using the security information obtained from the remote security device and the second credentials are usable to access at least one of second information or second functionality at the remote access device, wherein the remote security device is different than the remote access device; and
      access the at least one of the second information or the second functionality at the remote access device by providing the second credentials to the remote access device, the at least one of the second information or the second functionality having a different level of security than the at least one of the first information or the first functionality.

2. The computing device of claim 1, wherein the user flow includes authenticating to the remote access device.

3. The computing device of claim 1, wherein generation of the first credentials by the security component is enabled independent of network communications.

4. The computing device of claim 1, wherein the security information comprises one or more manufacturer certificates usable to generate an attestation statement as the second credentials, the attestation statement configured to prove, to the remote access device, that the computing device is trustworthy and has not been compromised.

5. The computing device of claim 1, wherein the first credentials comprise an encryption key usable to register the computing device with the remote access device.

6. The computing device of claim 5, wherein the instructions further cause the computing device to generate the encryption key as part of a pool of encryption keys prior to the generation of the second credentials.

7. The computing device of claim 6, wherein the instructions further cause the computing device to maintain a fixed size of the pool of encryption keys such that a new encryption key is generated in response to the encryption key being used to register the computing device with the remote access device.

8. The computing device of claim 1, wherein the remote security device comprises a certificate authority that is associated with a manufacturer of at least one of the computing device or the security component of the computing device that generates the first credentials and the second credentials, the certificate authority accessible by the computing device after a user has acquired the computing device.

9. The computing device of claim 1, wherein the instructions further cause the computing device to retrieve the security information from the remote security device in response to a first boot of the computing device.

10. A security device comprising:
at least one cryptographic processor; and
memory storing instructions that, when executed on the at least one cryptographic processor, cause the security device to:
receive a request to execute a user flow for a computing device;
determine that second credentials are temporarily unavailable due to security information not yet being obtained from a remote security device;
provide first credentials to establish a first level of trust between the computing device and a remote access device, the providing the first credentials enabling execution of the user flow without delay caused by the second credentials being temporarily unavailable;
obtain the security information from the remote security device, wherein the remote security device is different than the remote access device;
generate, using the security information, the second credentials, wherein the second credentials are usable to establish a second level of trust between the computing device and the remote access device, the second level of trust being more trustworthy than the first level of trust; and
provide the second credentials to establish the second level of trust between the computing device and the remote access device.

11. The security device of claim 10, wherein the instructions further cause the security device to provide the first credentials to a component of the computing device thereby enabling the component of the computing device to establish the first level of trust with the remote access device.

12. The security device of claim 10, wherein the instructions further cause the security device to provide the first credentials to the remote access device to establish the first level of trust between the computing device and the remote access device.

13. The security device of claim 10, wherein the instructions further cause the security device to generate the first credentials without having to access information over a network.

14. The security device of claim 10, wherein the security information comprises one or more manufacturer certificates usable to generate an attestation statement as the second credentials, the attestation statement configured to prove, to the remote access device, that the computing device is trustworthy and has not been compromised.

15. The security device of claim 10, wherein the instructions further cause the security device to retrieve the security information from the remote security device in response to a first boot of the computing device.

16. The security device of claim 10, wherein the instructions further cause the security device to:
generate separate attestation statements using the security information; and
respectively associate the separate attestation statements with separate accounts registered to, or set up on, the computing device.

17. A method comprising:
determining, by a computing device, that second credentials are unavailable due to security information not yet being retrieved from a remote security device;
providing, by the computing device, first credentials to a remote access device to establish a first level of trust with the remote access device;
retrieving the security information from the remote security device, wherein the remote security device is different than the remote access device;
generating, using the security information, the second credentials, wherein the second credentials are usable to upgrade the computing device from the first level of trust to a second level of trust, the second level of trust being more trustworthy than the first level of trust; and
providing the second credentials to the remote access device to upgrade the computing device from the first level of trust to the second level of trust.

18. The method of claim 17, further comprising generating the first credentials independent of using network communications.

19. The method of claim 17, wherein the security information comprises one or more manufacturer certificates usable to generate an attestation statement as the second credentials, the attestation statement configured to prove, to the remote access device, that the computing device is trustworthy and has not been compromised.

* * * * *